2 Sheets--Sheet 1.

ANDREW TURNBULL & RODOLPHUS L. WEBB.

Improvement in Bed Bottoms.

No. 5,185. Reissued Dec. 10, 1872.

Witnesses.
John H. Shumway
A. J. Tibbits

Andrew Turnbull & Rodolphus L. Webb
Inventors
By Atty.
Thos. E. Earle

ANDREW TURNBULL & RODOLPHUS L. WEBB.

2 Sheets--Sheet 2.

Improvement in Bed Bottoms.

No. 5,185.

Reissued Dec. 10, 1872.

Witnesses

John H. Shumway

A. J. Tibbits

Andrew Turnbull & Rodolphus L. Webb,
Inventors

By Attys

Thos. P. Earle

UNITED STATES PATENT OFFICE.

ANDREW TURNBULL AND RODOLPHUS L. WEBB, OF NEW BRITAIN, CONNECTICUT, ASSIGNORS, BY MESNE ASSIGNMENTS, TO THE NATIONAL WIRE-MATTRESS COMPANY, OF SAME PLACE.

IMPROVEMENT IN BED-BOTTOMS.

Specification forming part of Letters Patent No. 125,421, dated April 9, 1872; reissue No. 5,185, dated December 10, 1872.

*To all whom it may concern:*

Be it known that we, ANDREW TURNBULL and RODOLPHUS L. WEBB, of New Britain, in the county of Hartford and State of Connecticut, have invented a new Improvement in Bed-Bottoms; and we do hereby declare the following, when taken in connection with the accompanying drawing and the letters of reference marked thereon, to be a full, clear, exact description of the same, and which said drawing constitutes part of this specification, and represents, in—

Figure 1:
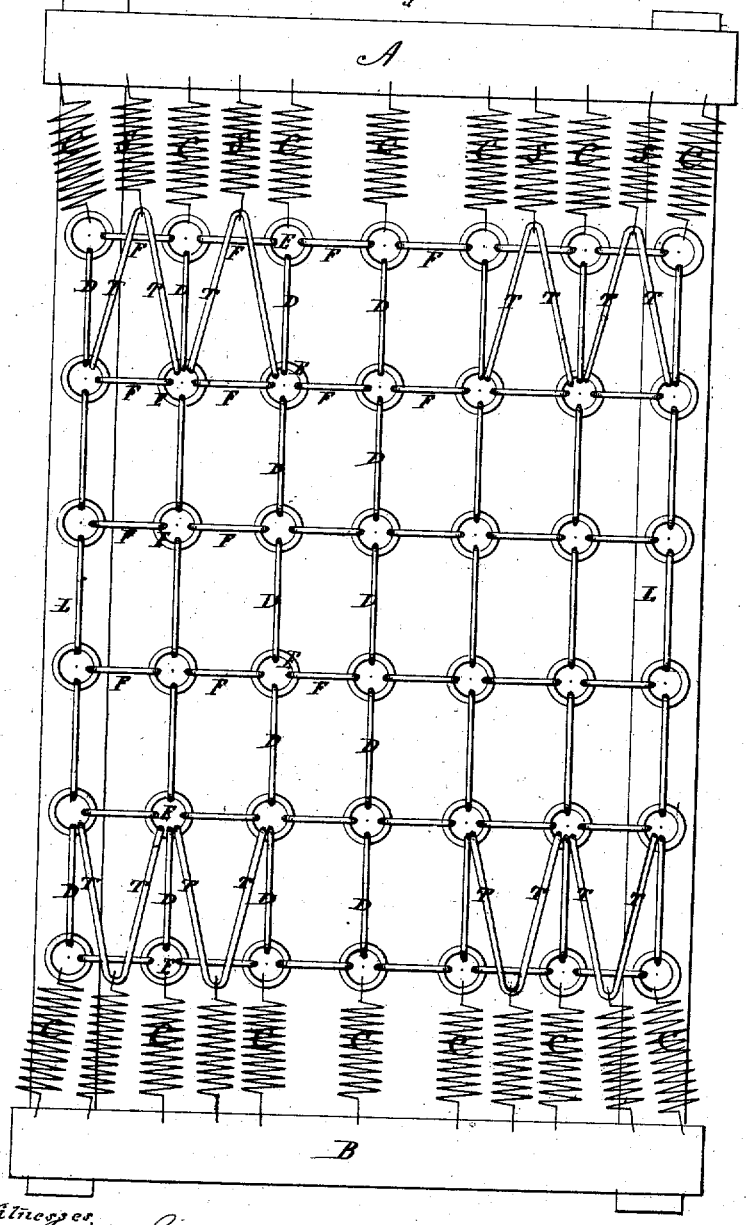
Figure 2:
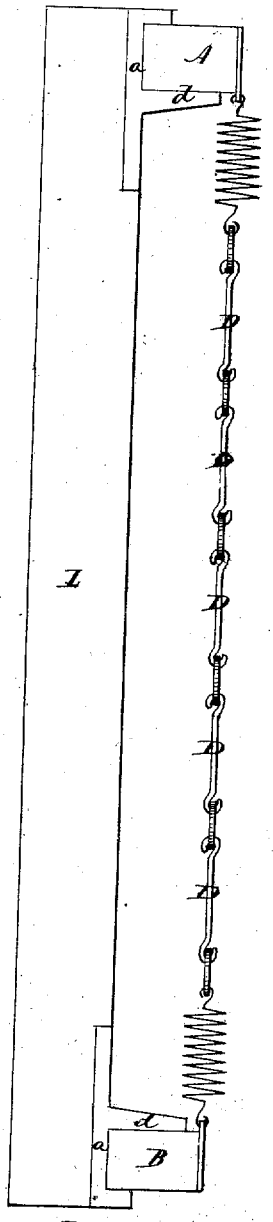
Figure 3:
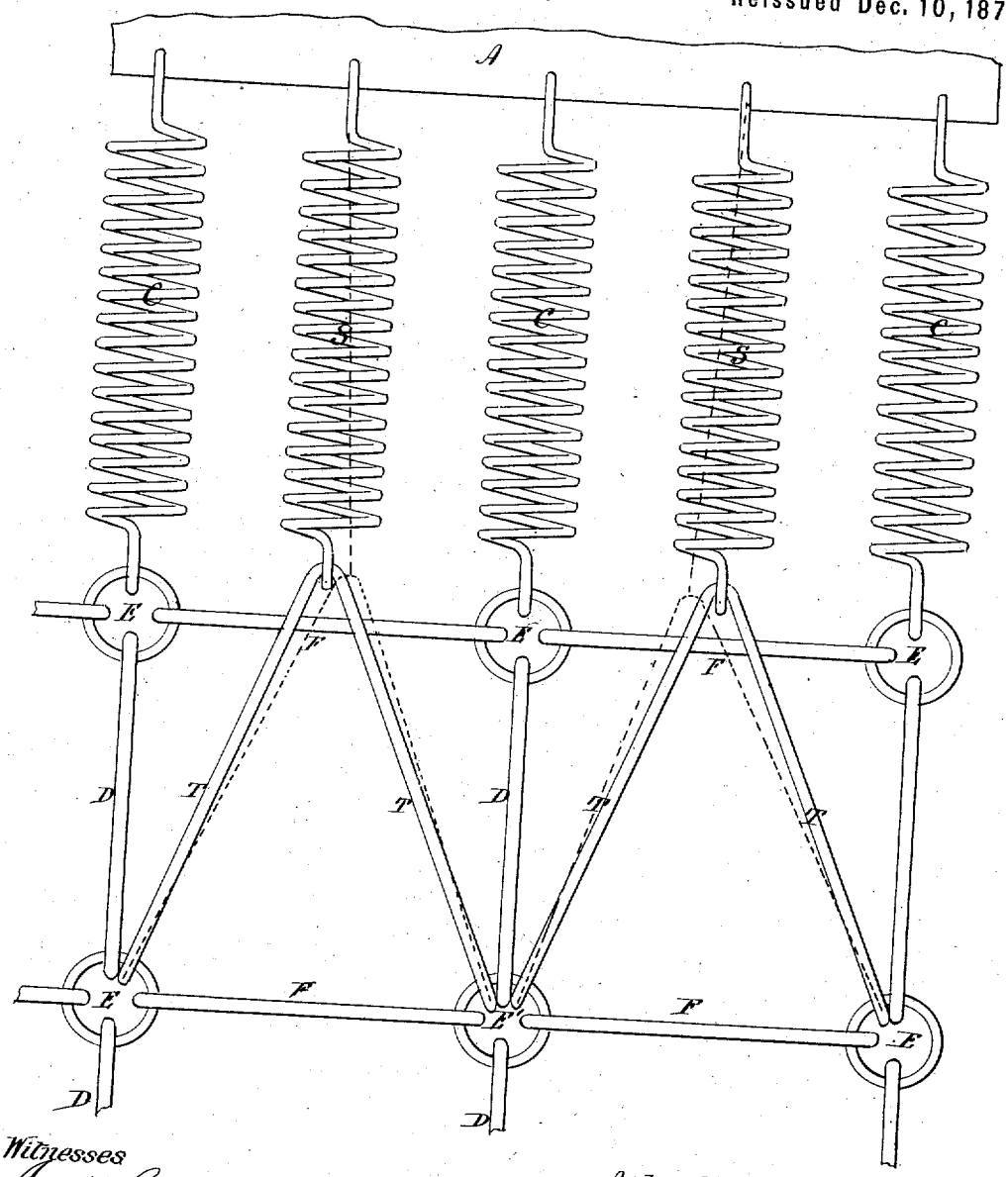

Figure 1, a plan view of the bed complete; in Fig. 2, a side view; and in Fig. 3, a diagram of one end.

This invention relates to an improvement in spring bed-bottoms; the principal object being the construction of a bed in which that part in the immediate vicinity of the occupant will yield and conform to his body; and it consists in a net-work formed of links jointed together and made elastic longitudinally by springs.

A represents the transverse bar at the head, and B the corresponding bar at the foot. To these bars are attached springs C, by preference spiral springs, the action of which is longitudinal with the bed-bottom. From these springs at one end extends a succession of jointed rods, D. These rods are, by preference, connected by rings E, but may be united by other suitable connections. Transversely to the rods D other rods, F, are arranged, as denoted in Fig. 1. Such rods D D and F F constitute, when combined together, jointed links. It will be better to make the rods F a little longer than the distance between the connections, which will allow of the longitudinal lines of rods to be depressed somewhat before the said transverse rods come to a bearing in their next adjoining connections. Therefore, when one of the longitudinal lines of rods is depressed, the next are not affected until the depression has been sufficient to bring the connections to a bearing. These jointed rods F, while, preferably, made of sufficient length to extend from one ring to another, as seen in Fig. 3, may be made in the form of chains. At the sides no connection is made with the frame—the whole length is left free from end to end. The result of this construction is that (a person lying upon one part of the bed) the bottom will yield to conform to the body without being affected or scarcely moved at any other part. Thus, a person lying upon one side of the bed and another person moving upon the opposite side does not necessarily move the bed beneath or disturb the other person. As an auxiliary spring to the spring before mentioned we arrange intermediate springs S with a triangular draw-rod, T T, extending from the said springs S to the links comprising the bed-bottom. These springs, while acting as auxiliary to the other springs, also aid in facilitating the object of this invention; for suppose, Fig. 3, the weight to be directly over the point E′, and that point depressed, this will take upon the spring in that longitudinal line, and, through the arm of the draw-rod which connects that point to the intermediate springs S, will draw upon these intermediate springs, as denoted by broken lines in Fig. 3. While it is preferable to attach a single spring to each longitudinal line of jointed rods, it will be evident that one stronger spring may be connected to two lines.

To construct the frame so that the bed may be packed into small compass and at the same time be sufficiently strong at each end of the two sides L L, we form a seat or socket, *a*, to receive the bars A B, the said seat constructed with a flange or upward projection, *d*, upon the inside of the said bars B, and against which they bear to resist the strain of the springs, this flange extending nearly to the top of the bar, as seen in Fig. 2; and when in position on the bedstead the strain of the springs will hold them in place.

As a matter of convenience for removal, the flanges may be secured to the bars A B by a screw or otherwise. Therefore, to pack the bedstead for transportation or storage, the bars A may be easily taken from the bars L and folded together or rolled with the bed-bottom, and which, with the bars L, may thus be arranged in a very compact form.

We claim as our invention—

1. A bed-bottom, composed of non-flexible links D D F F, jointed together and made elastic in the longitudinal direction only by springs C C, substantially as described.

2. In combination with the subject-matter of the first clause of claim, the auxiliary springs S and their triangular draw-bars T T, substantially as specified.

3. In a frame for bed-bottom, consisting of the transverse bars A B and longitudinal bars L L, the seat or socket *a d*, by which the said transverse bars are attached to the longitudinal bars, substantially as described.

ANDREW TURNBULL.
RODOLPHUS L. WEBB.

Witnesses:

JAS. D. FRARY,
JAMES SHEPARD.